US012564183B2

(12) United States Patent
Rupp et al.

(10) Patent No.: US 12,564,183 B2
(45) Date of Patent: Mar. 3, 2026

(54) FISHING ROD CAPTURE DEVICE

(71) Applicant: Quarry Trail, LLC, Salt Lake City, UT (US)

(72) Inventors: David Alonzo Rupp, Salt Lake City, UT (US); Brigham Wallace Rupp, Logan, UT (US)

(73) Assignee: Quarry Trail, LLC, Salt Lake City, UT (US)

( * ) Notice: Subject to any disclaimer, the term of this patent is extended or adjusted under 35 U.S.C. 154(b) by 0 days.

(21) Appl. No.: 18/923,471

(22) Filed: Oct. 22, 2024

(65) Prior Publication Data

US 2025/0143276 A1 May 8, 2025

Related U.S. Application Data

(60) Provisional application No. 63/597,268, filed on Nov. 8, 2023.

(51) Int. Cl.
*A01K 97/10* (2006.01)

(52) U.S. Cl.
CPC ................................... *A01K 97/10* (2013.01)

(58) Field of Classification Search
CPC ......... A01K 97/00; A01K 97/10; A01K 99/00
See application file for complete search history.

(56) References Cited

U.S. PATENT DOCUMENTS

| | | | | |
|---|---|---|---|---|
| 4,422,455 A | * | 12/1983 | Olsen | A61F 5/3761 |
| | | | | 128/882 |
| 6,267,276 B1 | * | 7/2001 | Cook | A01K 97/10 |
| | | | | 224/183 |
| 6,793,184 B2 | | 9/2004 | Dougal et al. | |
| 9,402,381 B1 | * | 8/2016 | Craddock | A01K 99/00 |
| 9,635,846 B2 | * | 5/2017 | Bargman | A01K 99/00 |
| 2017/0180524 A1 | * | 6/2017 | May | H01F 7/0263 |
| 2021/0307457 A1 | * | 10/2021 | Schapson | A44B 18/0073 |
| 2022/0248653 A1 | * | 8/2022 | Sutton | A01K 97/08 |
| 2024/0381846 A1 | * | 11/2024 | Sporn | A01K 27/005 |

FOREIGN PATENT DOCUMENTS

| | | | | |
|---|---|---|---|---|
| GB | 2512843 A | | 10/2014 | |
| GB | 2534602 A | * | 8/2016 | A01K 97/10 |
| TW | M597046 U | | 6/2020 | |
| TW | M647223 U | | 10/2023 | |

* cited by examiner

*Primary Examiner* — Richard G Davis

(74) *Attorney, Agent, or Firm* — Kirton McConkie; Brian Tucker

(57) ABSTRACT

Fishing rod capture devices can allow a fisher to quickly use both hands while fishing. A fishing rod capture device may include a rod securing component and a rod coupling component that is configured to couple to a fishing rod and that may be selectively supported from the rod securing component.

20 Claims, 10 Drawing Sheets

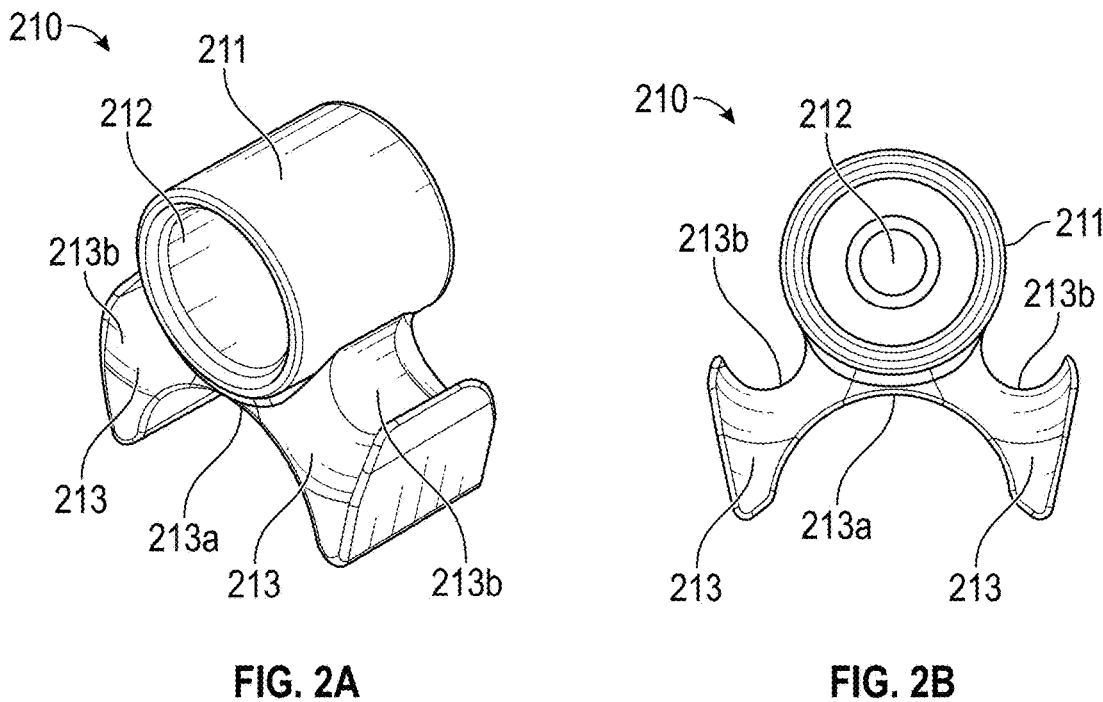
FIG. 2A               FIG. 2B
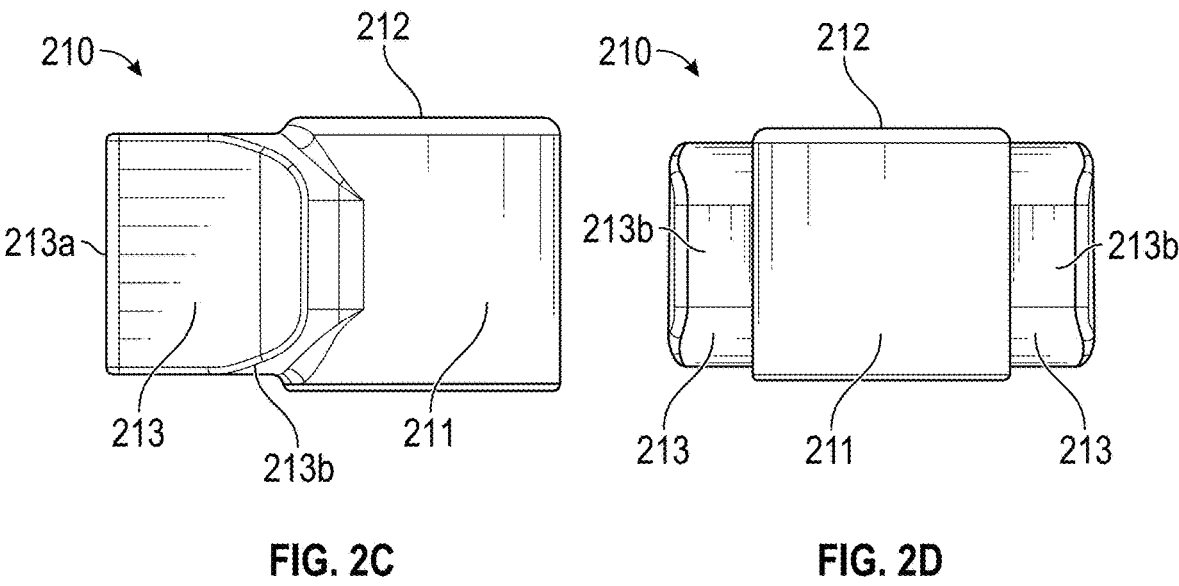
FIG. 2C               FIG. 2D

FISHING ROD CAPTURE DEVICE

CROSS-REFERENCE TO RELATED APPLICATIONS

This application claims the benefit of U.S. Provisional Patent Application No. 63/597,268.

BACKGROUND

When a fisher catches a fish using a fishing rod, he or she may typically use a net to secure the fish while removing the hook from the fish's mouth. Given that this is a two-hand process, the fisher will typically place the fishing rod on the ground while removing the hook. This may cause the fishing rod to become wet, dirty, damaged or even lost.

To address such issues, various types of fishing rod holders have been developed. For example, some fishing rod holders are designed to secure to the fisher's belt and form a sleeve in which the fishing rod can be inserted.

BRIEF SUMMARY

The present disclosure relates to fishing rod capture devices. A fishing rod capture device may include a rod securing component and a rod coupling component that is configured to couple to a fishing rod and that may be selectively supported from the rod securing component.

In some embodiments, a fishing rod capture device may include a rod securing component having a first magnet and a rod coupling component that is configured to couple to a fishing rod. The rod coupling component may have a second magnet by which the rod coupling component is selectively supported from the rod securing component to thereby capture the fishing rod.

In some embodiments, the rod coupling component may include a wrapping member by which the rod coupling component is coupled to the fishing rod.

In some embodiments, the wrapping member may include a ring.

In some embodiments, the rod coupling component may include a connection structure and the ring may connect between opposing sides of the connection structure.

In some embodiments, the connection structure may include opposing wings.

In some embodiments, each of the opposing wings may form a hooking surface by which the ring connects to the opposing wing.

In some embodiments, the rod coupling component is formed by opposing base member components that are secured together on opposing sides of the fishing rod, each of the opposing base member components has a crescent shape, and the rod securing component includes a housing having a crescent shape.

In some embodiments, the first magnet is crescent shaped and secured within the housing, and the second magnet is crescent shaped and secured within one of the opposing base member components.

In some embodiments, the wrapping member may be a ring-shaped extension from a connection structure of the rod coupling component.

In some embodiments, a base of the wrapping member by which the wrapping member connects to the connection structure may have a larger dimension than the connection structure and an end of the wrapping member opposite the base may wrap around the connection structure and may be held in place by the base of the wrapping member.

In some embodiments, the rod securing component may include a coupling point and a housing. The coupling point may be configured to couple the rod securing component to a fisher or an adjacent structure. The housing may house the first magnet.

In some embodiments, the first magnet may be oriented away from the coupling point.

In some embodiments, the first magnet may be oriented towards the coupling point.

In some embodiments, the housing may be spaced from the coupling point by one or more arms such that an opening is formed between the housing and the coupling point.

In some embodiments, the rod coupling component may include a base member in which the second magnet is positioned. The base member may insert into the opening to connect the second magnet to the first magnet.

In some embodiments, a fishing rod capture device may include a rod securing component having a first fastening component and a rod coupling component that includes a wrapping member by which the rod coupling component is coupled to a fishing rod. The rod coupling component may have a second fastening component by which the rod coupling component may be selectively supported from the rod securing component to thereby capture the fishing rod.

In some embodiments, the first and second fastening components may be first and second magnets.

In some embodiments, the wrapping member may be a ring or a ring-shaped extension.

In some embodiments, the rod securing component may form a connection structure by which the rod securing component may be coupled to a fisher.

In some embodiments, a fishing rod capture device may include a rod securing component having a housing containing a first magnet and a rod coupling component having a base member containing a second magnet that interfaces with the first magnet to thereby selectively support the rod coupling component from the rod securing component. The rod coupling component may be configured to couple to a fishing rod such that the fishing rod may be captured when the rod coupling component is supported from the rod securing component.

In some embodiments, the rod coupling component may include a wrapping member by which the fishing rod is coupled to the rod coupling component.

In some embodiments, the rod coupling component may include a connection structure, and the wrapping member may either be removably coupled to or within the connection structure or integrated into the connection structure.

This summary is provided to introduce a selection of concepts in a simplified form that are further described below in the Detailed Description. This summary is not intended to identify key features or essential features of the claimed subject matter.

BRIEF DESCRIPTION OF THE DRAWINGS

Understanding that these drawings depict only typical embodiments of the present disclosure and are not therefore to be considered limiting of its scope, the present disclosure will be described and explained with additional specificity and detail through the use of the accompanying drawings in which:

FIGS. 2A-2D are perspective, bottom, side, and rear views respectively of a base member of a rod coupling component of the fishing rod capture device shown in FIGS. 1A-1C;

DETAILED DESCRIPTION

In the specification and the claims, the terms "first magnet" and "second magnet" (and similar references to multiple magnets) should be construed as encompassing embodiments where both the first and second magnets produce magnetic fields (i.e., they are both actual magnets) and embodiments where only one of the first and second magnets produces a magnetic field and the other of the first and second magnets is a ferromagnetic material but does not produce its own magnetic field (e.g., a piece of iron or steel).

Figure 1A:
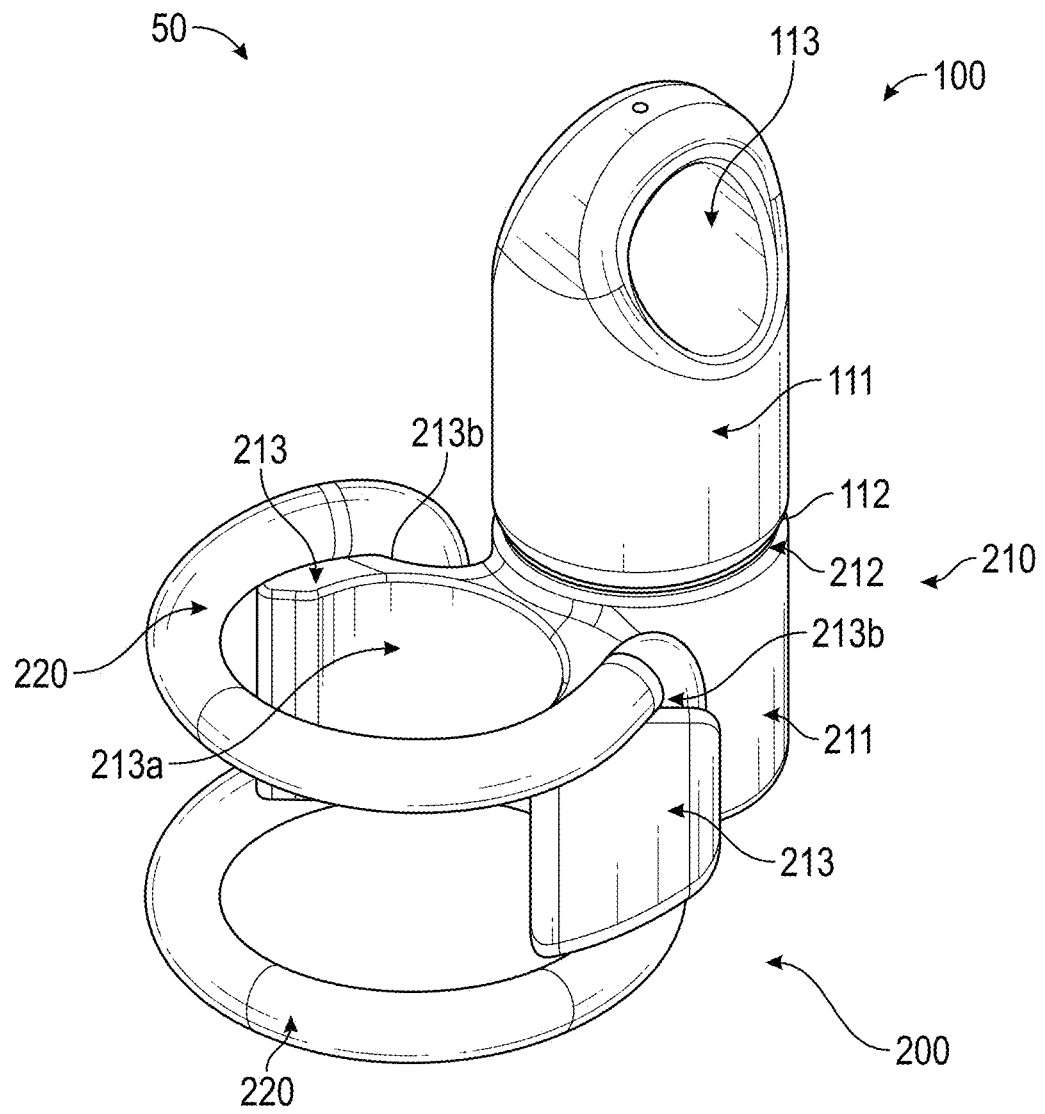
FIGS. 1A-1C are perspective, top, and side views respectively of a fishing rod capture device that is configured in accordance with one or more embodiments of the present disclosure.
Figure 1B:
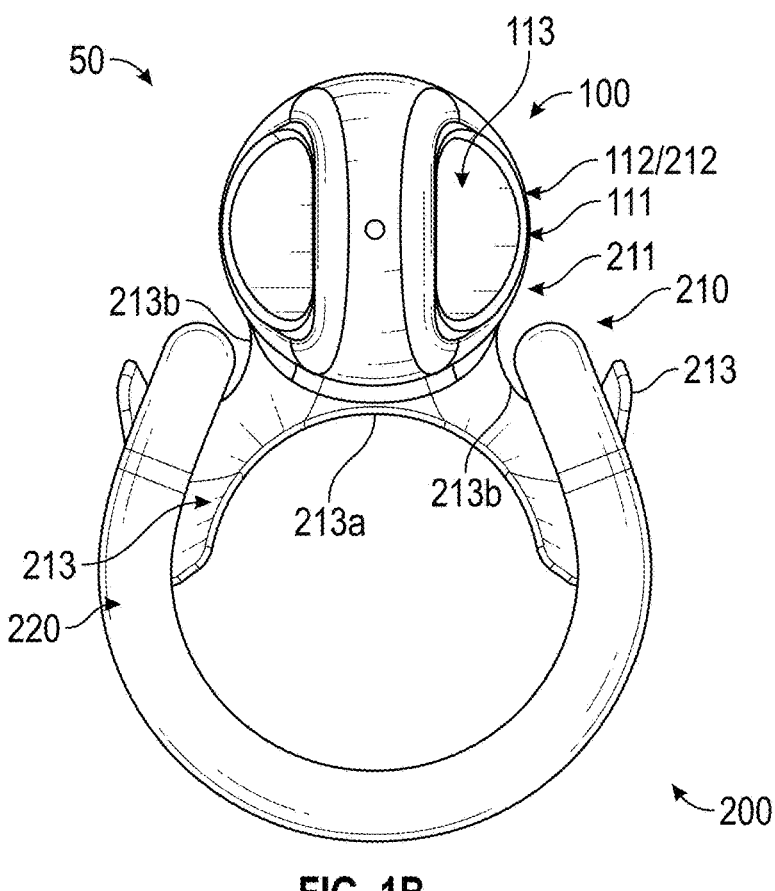
Figure 1C:
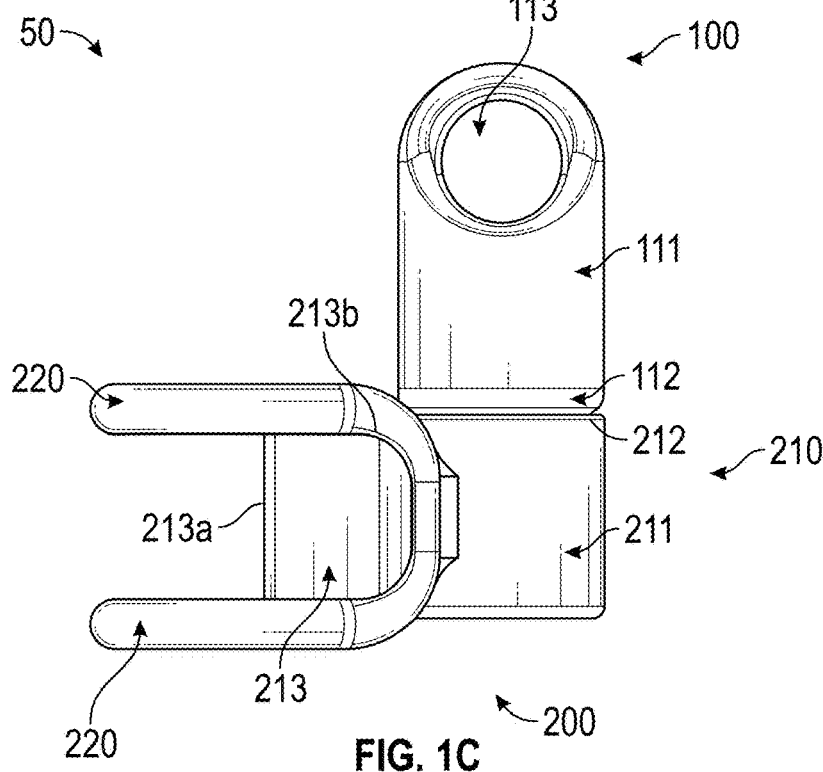

FIGS. 1A-1C illustrate a fishing rod capture device 50 that is configured in accordance with one or more embodiments of the present disclosure. Fishing rod capture device 50 generally includes a rod securing component 100 and a rod coupling component 200. Rod coupling component 200 is configured to be coupled to a fishing rod including while fishing. Rod securing component 100 is configured to be coupled to the fisher or an adjacent structure. Rod securing component 100 and rod coupling component 200 are configured to be selectively connected so that a fishing rod to which rod coupling component 200 is coupled can be selectively supported from rod securing component 100.

Figure 6A:
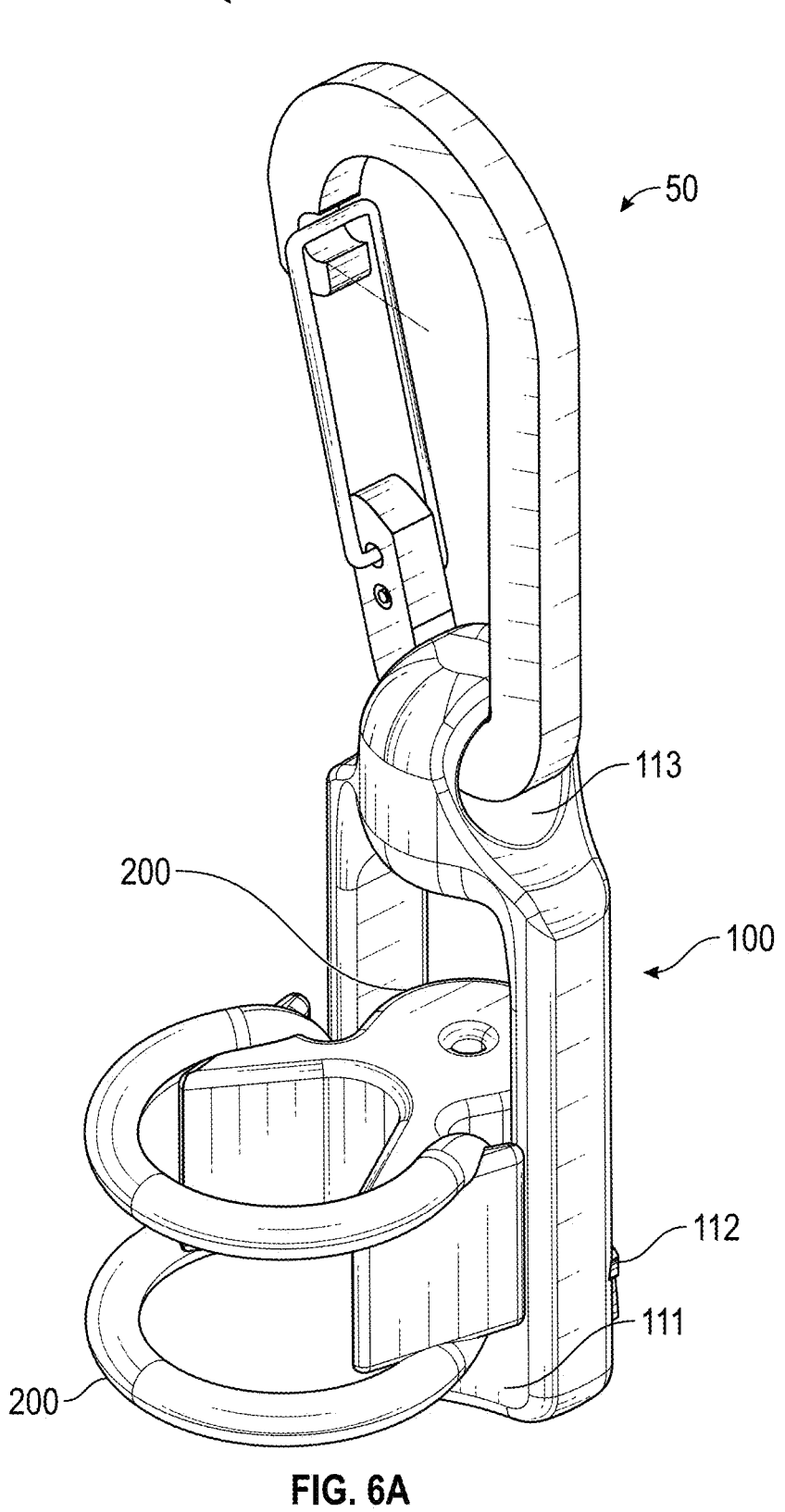
FIGS. 6A and 6B are combined and exploded views of another fishing rod capture device that is configured in accordance with embodiments of the present disclosure.
Figure 6B:
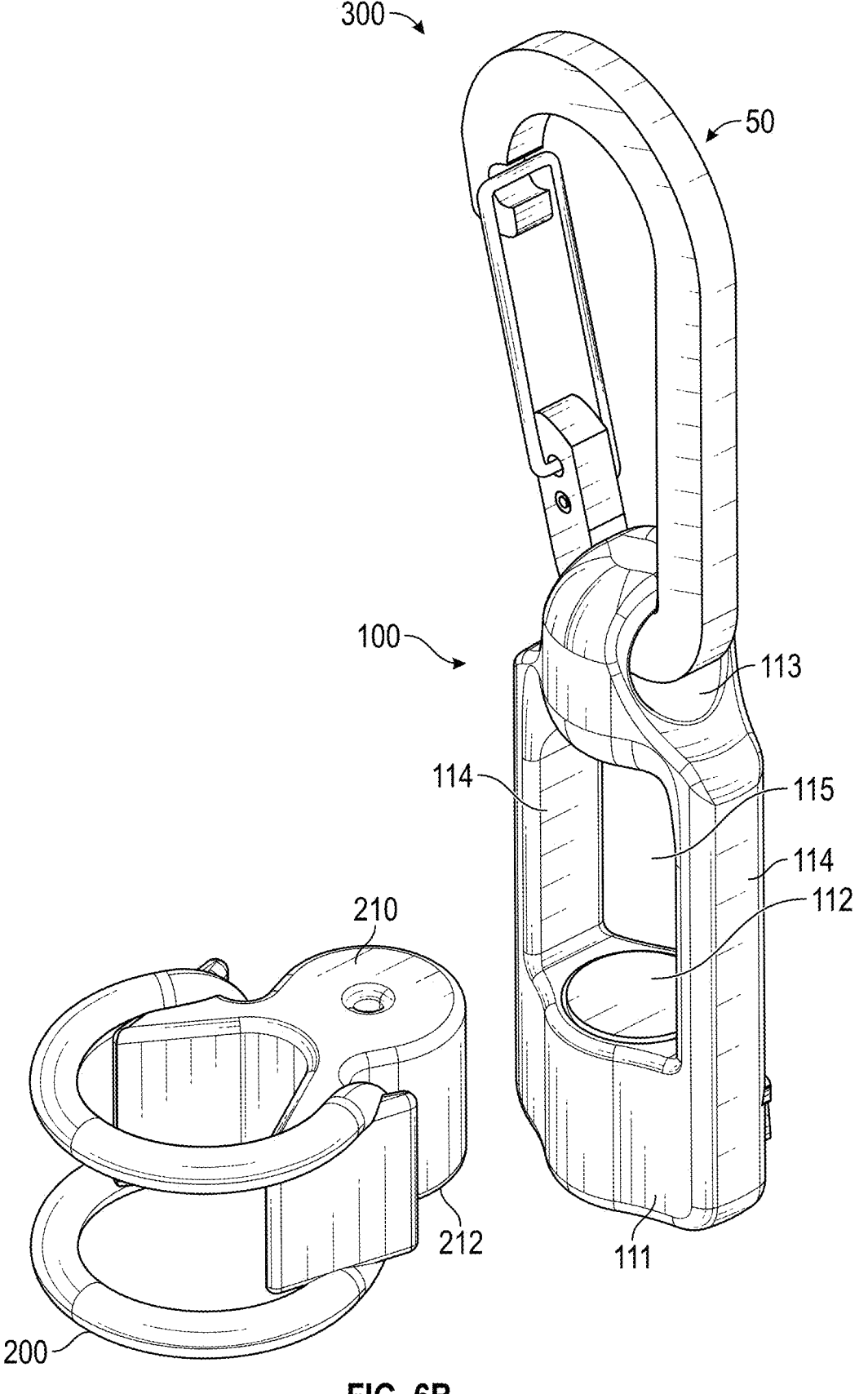

In some embodiments, rod securing component 100 can include a housing 111 that contains a magnet 112 and that forms or includes a coupling point 113 by which housing 111 can be coupled to the fisher. In the embodiment depicted in FIGS. 1A-1C, housing 111 forms a flat bottom surface in which magnet 112 is positioned and has a ring-shaped top that forms coupling point 113. However, other shapes and configurations of housing 111 could be used such as, for example, as shown in FIGS. 6A and 6B.

In some embodiments, rod coupling component 200 can include a base member 210 and a wrapping member 220. Base member 210 can include a housing 211 that contains a magnet 212 and that forms a connection structure 213 by which wrapping member 220 may be secured to housing 211.

FIGS. 2A-2D illustrate an example of rod coupling component 200 in isolation. In some embodiments, housing 211 can have the same or similar shape and/or size as housing 111. For example, housing 211 can form a flat top surface in which magnet 212 is positioned. This flat top surface can therefore be aligned with the flat bottom surface of housing 111 to cause magnets 112 and 212 to secure rod coupling component 200, and therefore the fishing rod, to rod securing component 100. In some embodiments, connection structure 213 may form a channel 213a configured to receive a fishing rod. For example, connection structure 213 may be formed by opposing wings to protrude from a side of housing 211.

In some embodiments, wrapping member 220 may be separable from connection structure 213. For example, in FIGS. 1A-1C, wrapping member 220 is in the form of a ring that can be hooked around opposing sides of connection structure 213. For example, when connection structure 213 is in the form of opposing wings, a rear side of the opposing wings can form hooking surfaces 213b for securing opposing sides of a ring-shaped wrapping member 220 that is wrapped around a fishing rod.

Figures 3A, 3B:
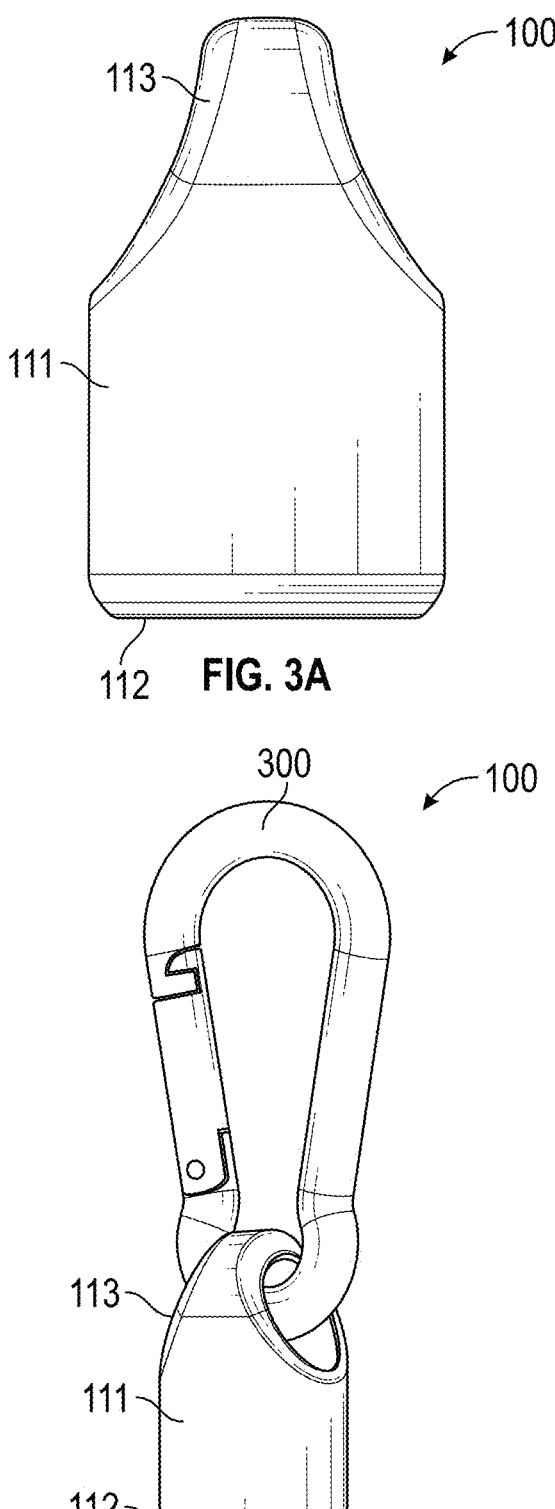
FIG. 3A is a side view of a rod securing component of the fishing rod capture device shown in FIGS. 1A-1C.
FIG. 3B is a side view of the rod securing component of FIG. 3A with a coupling mechanism connected.

FIG. 3A illustrates rod securing component 100 in isolation, and FIG. 3B illustrates rod securing component 100 in isolation when a carabiner 300 is coupled to coupling point 113. In such cases, carabiner 300 could be used to secure rod securing component 100 to the fisher's vest, belt, backpack, etc.

Figure 4A:
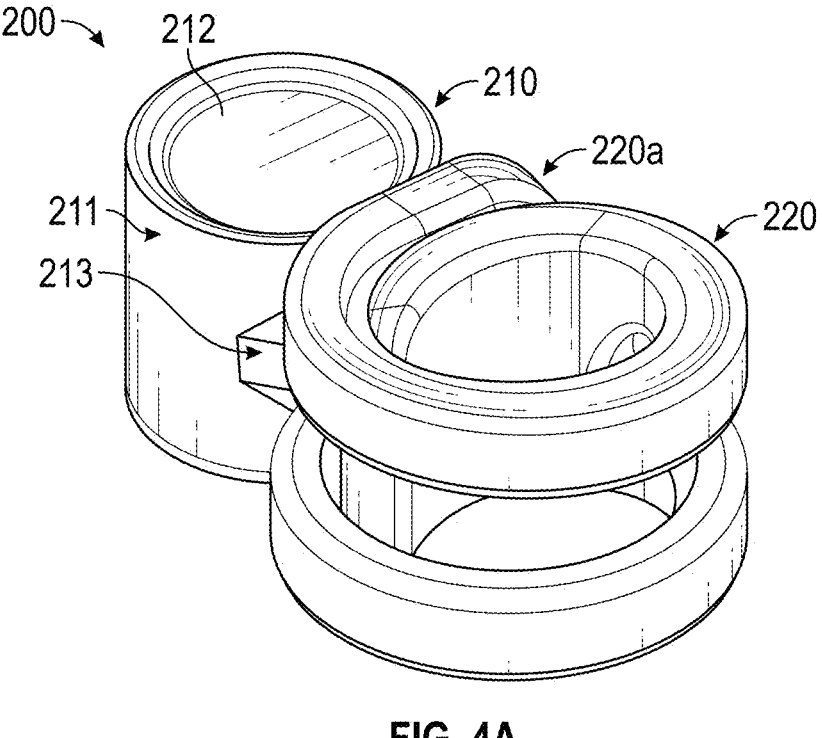
FIGS. 4A and 4B are perspective views of another design of a rod securing component that may be used on a fishing rod capture device configured in accordance with embodiments of the present disclosure.
Figure 4B:
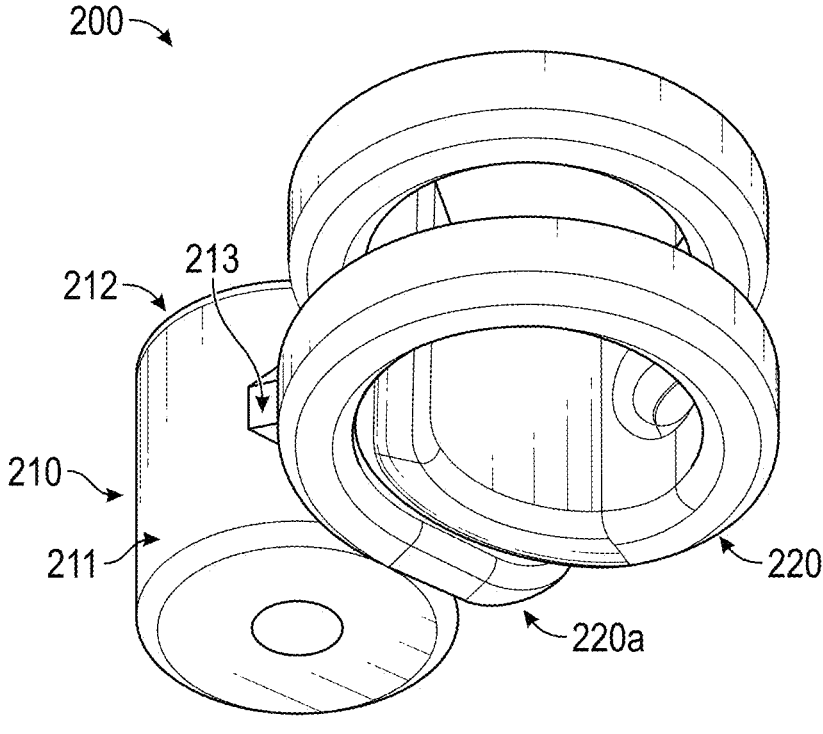

FIGS. 4A and 4B provide another example of how rod coupling component 200 may be configured in one or more embodiments. In this example, wrapping member 220 is a flexible (e.g., rubber or rubber-like material) ring-shaped extension from connection structure 213. The base of wrapping member 220 may have a larger dimension than connection structure 213 such that the end of wrapping member 220 can be wrapped around connection structure 213 to secured in place.

Figure 5:
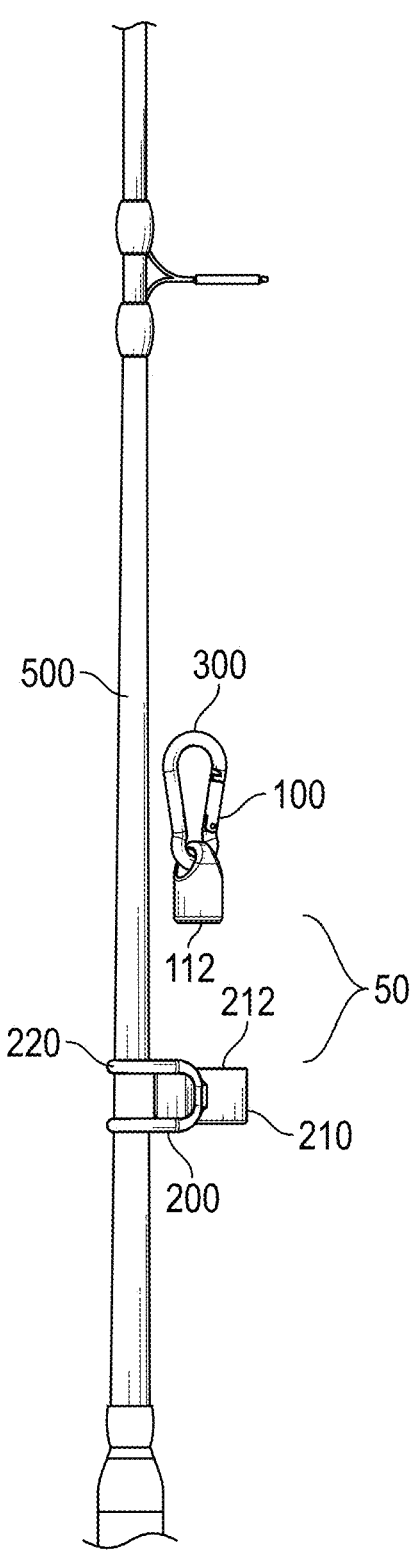
FIG. 5 is an example of how a fishing rod capture device can be used.

FIG. 5 provides an example of how fishing rod capture device 50 may be used. In this example, fishing rod capture device 50 includes the example of rod coupling component 200 shown in FIGS. 4A and 4B. In FIG. 5, rod coupling component 200 has been coupled to a fishing rod 500 such that magnet 212 is oriented generally towards the distal end of fishing rod 500 (where distal refers to the end opposite the handle). Rod securing component 100 is shown disconnected from rod coupling component 200 and could be coupled to the fisher's vest via carabiner 300. In this state, the fisher could use fishing rod 500 in a typical fashion to fish. Once the fisher catches a fish or otherwise desires to use both hands, he or she can move fishing rod 500 to position base member 210 sufficiently near rod securing component 100 to cause magnets 112 and 212 to retain base member 210 against rod securing component 100. Due to wrapping member 220, fishing rod 500 will be supported from rod securing component 100 thereby allowing the fisher to use both hands without having to place fishing rod 500 in the water or on the ground. When the fisher desires to resume fishing, he or she can grasp fishing rod 500 and immediately detach it from rod securing component 100 with a pulling or other suitable motion.

In some embodiments, the magnets could be replaced with other types of fasteners such as hook and loop, reusable adhesives, interlocking structural components, etc. The term "fastening components" will be used to represent any pair of components that selectively couple to secure the rod coupling component to the rod securing component.

FIGS. 6A and 6B illustrate another example of how fishing rod capture device 50 could be configured in one or more embodiments. In this example, housing 111 is spaced from coupling point 113 by arms 114 to thereby form an opening 115 between housing 111 and coupling point 113. Housing 111 is also configured to form a flat top surface in which magnet 112 is positioned. In this example, rod coupling component 200 can be configured in any of the above-described manners but may be oriented upside down relative to the previously described embodiments. More particularly, base member 210 may insert between arms 114 into opening 115 with magnet 212 facing downward so that magnets 112, 212 can secure rod securing component 100 and rod coupling component 200 together. In such embodiments, arms 114 can provide an additional mechanism for preventing the unintended decoupling of rod coupling component 200 from rod securing component 100.

Figure 7A:
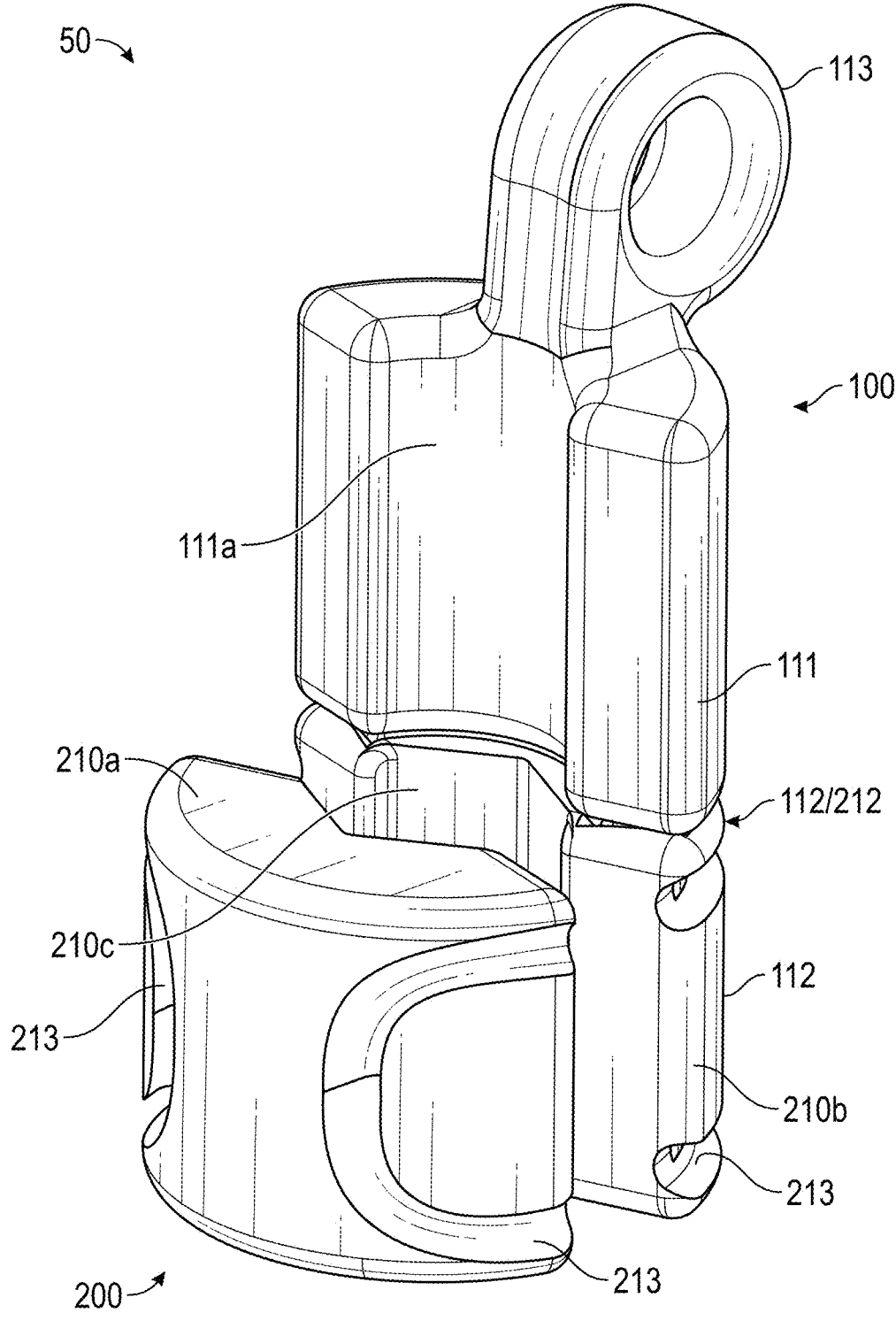
FIGS. 7A and 7B are combined and exploded views of another fishing rod capture device that is configured in accordance with embodiments of the present disclosure.
Figure 7B:
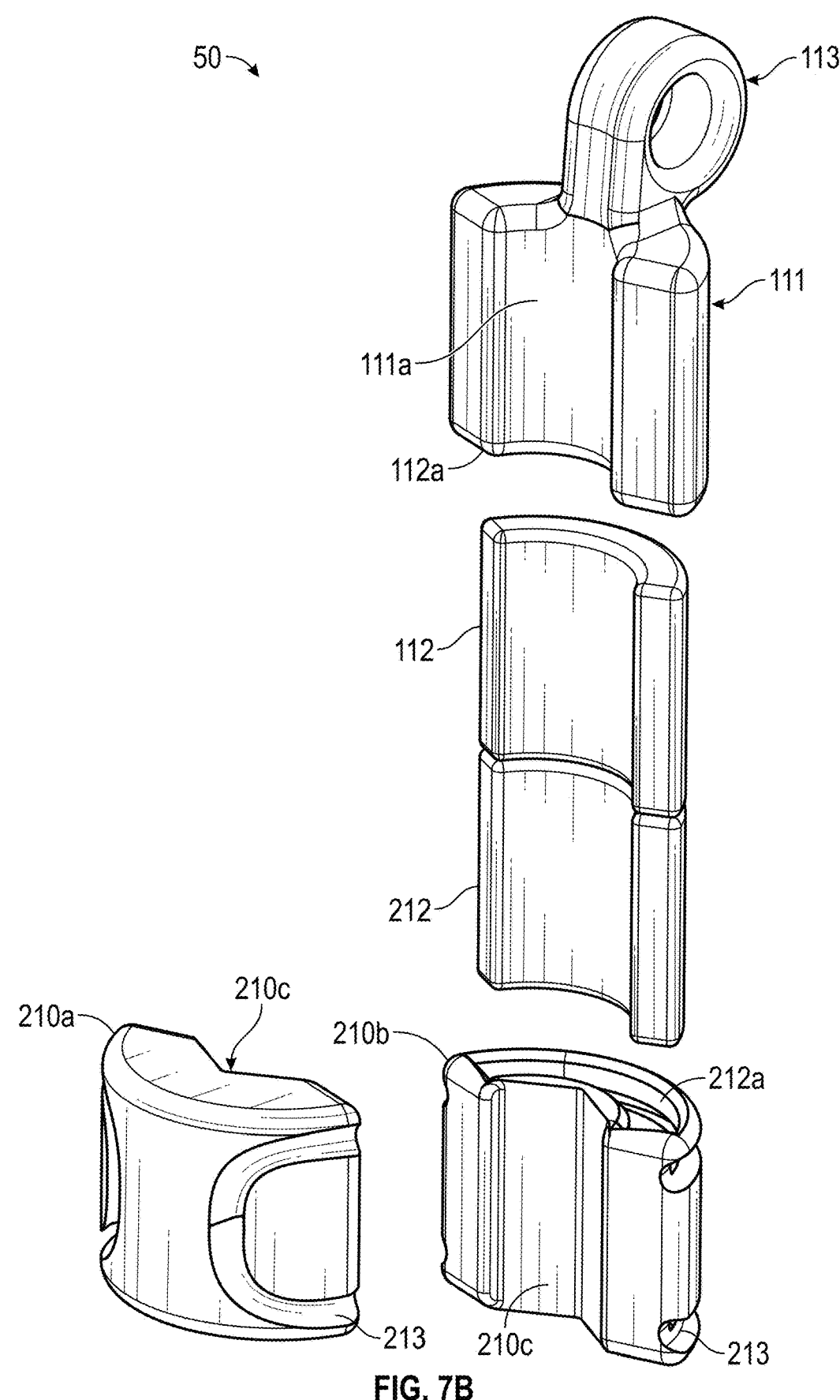

FIGS. 7A and 7B illustrate another example of how fishing rod capture device 50 could be configured in one or more embodiments. In this example, base member 210 is formed by opposing base member components 210a, 210b that have a crescent shape forming a channel 210c in which the fishing rod can be positioned when base member components 210a, 210b are positioned on opposing sides of the fishing rod. Wrapping member 220 (not shown) can be used to couple base member components 210a, 210b together. In some embodiments, including the depicted embodiments, base member components 210a, 210b can include a recessed connection structure 213 into which wrapping member 220 inserts. In this way, base member 210 forms a round structure when coupled to the fishing rod to minimize the risk of the fishing line getting caught on fishing rod capture device 50.

In such embodiments, housing 111 of rod securing component 100 may also have a crescent shape that forms a channel 111a that aligns with channel 210c. Magnets 112 and 212 may be positioned within housing 111 and within one of the base member components, which in the depicted embodiments is base member component 212a. For example, openings 112a and 212a may be formed for receiving magnets 112 and 212 respectively. In some embodiments, magnets 112 and 212 may have a crescent shape corresponding to the crescent shape of housing 111 and base member component 212a. In other embodiments, these crescent-shaped magnets 112 and 212 may each be replaced with multiple cylindrical magnets. For example, in place of what is shown, three cylindrical magnets could be used where the magnets are positioned in the middle and at the ends of the crescent-shaped face of housing 112 and base member component 212a.

Any of the above-described features can be used on any embodiment of a fishing rod capture device that is configured in accordance with the present disclosure. In particular, no feature or combination of features should be limited to any of the embodiments depicted in the figures.

What is claimed:

1. A fishing rod capture device comprising:
a rod securing component comprising a first housing that contains a first magnet, the first housing also forming a coupling point configured to couple the rod securing component to a fisher; and
a rod coupling component comprising a base member, the base member forming a second housing that contains a second magnet, the second housing also forming a connection structure configured to secure the base member to a fishing rod;
wherein the first and second magnets are configured to enable the rod coupling component to be selectively coupled to the rod securing component to thereby allow the fishing rod to be selectively supported from the fisher when the rod securing component is coupled to the fisher via the coupling point;
wherein the connection structure is configured to retain the fishing rod when the fishing rod is supported from the fisher.

2. The fishing rod capture device of claim 1, wherein the rod coupling component includes a wrapping member that is interfaced with the connection structure and extends around the fishing rod to secure the base member to the fishing rod.

3. The fishing rod capture device of claim 2, wherein the wrapping member comprises a ring that is elastic.

4. The fishing rod capture device of claim 3, wherein the ring is interfaced with the connection structure by connecting between opposing sides of the connection structure.

5. The fishing rod capture device of claim 4, wherein the connection structure comprises opposing wings, wherein each of the opposing wings forms a hooking surface by which the ring connects to the opposing wing.

6. The fishing rod capture device of claim 2, wherein the wrapping member is a ring-shaped extension from the connection structure, and wherein a base of the wrapping member by which the wrapping member connects to the connection structure has a larger dimension than the connection structure and an end of the wrapping member opposite the base wraps around the connection structure and is held in place by the base of the wrapping member.

7. The fishing rod capture device of claim 2, wherein the wrapping member is separable from the connection structure.

8. The fishing rod capture device of claim 1, wherein the base member comprises opposing base member components that are secured together on opposing sides of the fishing rod, each of the opposing base member components having a crescent shape, and wherein the first housing has a crescent shape.

9. The fishing rod capture device of claim 8, wherein a first base member component of the opposing base member components forms the second housing, wherein the first and second magnets are crescent shaped.

10. The fishing rod capture device of claim 1, wherein the coupling point is formed at a top of the first housing and the first magnet is positioned at a bottom of the first housing.

11. The fishing rod capture device of claim 1, wherein the coupling point is configured to receive a carabiner.

12. The fishing rod capture device of claim 11, wherein the first magnet is spaced from the coupling point by one or more arms such that an opening is formed between the first magnet and the coupling point.

13. The fishing rod capture device of claim 12, wherein the base member inserts into the opening to connect the second magnet to the first magnet.

14. A fishing rod capture device comprising:
a rod securing component comprising a first housing that contains a first magnet, the first housing also forming a coupling point configured to couple the rod securing component to a fisher; and
a rod coupling component comprising a base member and a wrapping member, the base member forming a second housing that contains a second magnet, the second housing also forming a connection structure;
wherein the wrapping member interfaces with the connection structure and is configured to extend around the fishing rod to fix the base member to the fishing rod;
wherein the first and second magnets are configured to enable the rod coupling component to be selectively coupled to the rod securing component to thereby allow the fishing rod to be selectively supported from the fisher when the rod securing component is coupled to the fisher via the coupling point.

15. The fishing rod capture device of claim 14, wherein the wrapping member is a ring that is selectively coupled between opposing sides of the connection structure.

16. The fishing rod capture device of claim 15, wherein the ring is elastic.

17. The fishing rod capture device of claim 14, wherein the wrapping member is separable from the connection structure.

18. The fishing rod capture device of claim 14, wherein the coupling point is configured to receive a carabiner.

19. A fishing rod capture device comprising:

a rod securing component having a first magnet; and a rod coupling component having a second magnet by which the rod coupling component is selectively coupled to the rod securing component;

wherein the rod coupling component comprises a connection structure and a ring, wherein the connection structure has opposing wings, wherein each of the opposing wings forms a hooking surface by which the ring connects to the opposing wing when the ring extends around a fishing rod to thereby secure the rod coupling component to the fishing rod while the rod coupling component is coupled to the rod securing component.

20. The fishing rod capture device of claim 19, wherein the rod securing component includes a coupling point by which the rod securing component can be coupled to a fisher.

\* \* \* \* \*